United States Patent

Takagishi et al.

Patent Number: 6,057,397
Date of Patent: May 2, 2000

[54] RUBBER COMPOSITION AND PROCESS FOR PREPARING THE SAME

[75] Inventors: Yukio Takagishi; Masao Nakamura, both of Kawasaki, Japan

[73] Assignee: Nippon Zeon Co., Ltd., Tokyo, Japan

[21] Appl. No.: 08/875,293

[22] PCT Filed: Jan. 23, 1996

[86] PCT No.: PCT/JP96/00114

§ 371 Date: Nov. 13, 1997

§ 102(e) Date: Nov. 13, 1997

[87] PCT Pub. No.: WO96/23027

PCT Pub. Date: Aug. 1, 1996

[30] Foreign Application Priority Data

Jan. 23, 1995 [JP] Japan .................................. 7-027543

[51] Int. Cl.$^7$ .................................................. C08K 3/00
[52] U.S. Cl. .................. 524/492; 524/493; 525/318.42; 525/320; 525/329.1
[58] Field of Search .................................. 524/492, 493; 526/318.42, 320, 329.1

[56] References Cited

U.S. PATENT DOCUMENTS

| | | | | |
|---|---|---|---|---|
| 3,175,997 | 3/1965 | Hsieh | ..................................... | 260/85.1 |
| 4,150,014 | 4/1979 | Edwards | .............................. | 260/42.32 |
| 4,357,432 | 11/1982 | Edwards | .................................. | 523/351 |

FOREIGN PATENT DOCUMENTS 2816065  10/1978  Germany .

OTHER PUBLICATIONS

"Handbook of Fillers for Plastics", ed Katz and Milewski (1987).

Abstract of Jap. Laid–Open Pat. Appln. Publ. No. 58–29812 (Feb. 22, 1983).

I. Franta: "Elastomers and Rubber Compounding Materials", Elseviers, Amsterdam (1989) pp. 410–411.

*Primary Examiner*—Edward J. Cain
*Attorney, Agent, or Firm*—Sherman and Shalloway

[57] ABSTRACT

There is provided a silica-containing diene rubber composition superior in resiliene (which is an indication of rolling resistance), at least equal, in tensile strength and abrasion resistance, to carbon black-containing diene rubber compositions, and good in processability and hardness property. The silica-containing diene rubber composition is characterized by containing, as the diene rubber component, a hydroxyl group-containing diene rubber having a weight-average molecular weight of 50,000 or more, or a blend of the hydroxyl group-containing diene rubber and other diene rubber. This composition is produced by a process which uses, as the diene rubber component, a hydroxyl group-containing diene rubber having a weight-average molecular weight of 50,000 or more, or a combination of the hydroxyl group-containing diene rubber and other diene rubber and wherein the mixing of components is conducted by mixing the diene rubber component with at least part of a required amount of silica and then mixing the resulting mixture with the remainder of silica and other compounding agents.

28 Claims, No Drawings

RUBBER COMPOSITION AND PROCESS FOR PREPARING THE SAME

TECHNICAL FIELD

The present invention relates to a rubber composition comprising a diene rubber and silica as reinforcing agent. More particularly, the present invention relates to a silica-containing diene rubber composition superior in resilience, tensile properties, abrasion property, hardness property and processability and also to a process for production of the rubber composition.

BACKGROUND ART

In recent years, as energy saving, environmental protection, etc. have come to be considered more important, the requirement for lower fuel consumption of automobiles has become increasingly severe. In this connection, tires for automobiles are required to have a smaller rolling resistance so as to be able to contribute to lower fuel consumption. In order to allow a tire to have a smaller rolling resistance, there is generally used a rubber material for tire which can give a vulcanized rubber of higher resilience.

It has heretofore been proposed to obtain a high resilience by using, as a rubber material for tire, a rubber composition comprising a diene rubber and, as a reinforcing agent, silica in place of carbon black. This silica-containing diene rubber composition, however, has had a problem in that the composition is unable to give sufficient abrasion resistance and tensile strength as compared with carbon black-containing diene rubber compositions. One reason therefor is thought to be that the affinity of silica to diene rubber is smaller than the affinity of carbon black to diene rubber, making it impossible to obtain sufficient reinforcing effects.

In order to enhance the affinity of silica to diene rubber, it has been studied to use a diene rubber into which a group having affinity to silica is introduced. For example, in the case of diene rubber produced by emulsion polymerization, there was proposed a diene rubber into which a tertiary amino group is introduced (JP-A-1-101344); and in the case of diene rubber produced by anionic polymerization, there was proposed a diene rubber into which an alkylsilyl group (JP-A-1-188501), a halogenated silyl group (JP-A-5-230286) or a substituted amino group (JP-A-64-22940) is introduced.

Many of these diene rubbers into which one of the above-mentioned groups is introduced, however, strongly adhere to silica in blending with silica, causing insufficient dispersion; therefore, the resulting blends are inferior in processability and hardness property and are not sufficiently improved in properties such as resilience, tensile strength, abrasion resistance and the like.

DISCLOSURE OF THE INVENTION

The object of the present invention lies in providing a silica-containing diene rubber composition superior in resiliene (which is an indication of rolling resistance), at least equal, in tensile strength and abrasion resistance, to carbon black-containing diene rubber compositions, and good in processability and hardness property.

The present inventors made an intensive study in order to overcome the above-mentioned problems of the prior art. As a result, the present inventors found out that a rubber composition good in processability and hardness property, high in resilience and sufficient in tensile strength and abrasion resistance is obtainable by using, as a diene rubber component to be reinforced with silica, at least one kind of hydroxyl group-containing diene rubber having a weight-average molecular weight of 50,000 or more, or a combination of at least one kind of the hydroxyl group-containing diene rubber and other diene rubber.

The present inventors found out also that a rubber composition further improved in procesability and giving a vulcanized rubber of improved properties is obtainable by, in producing a rubber composition by mixing various components, mixing a diene rubber with the total or part of a required amount of silica and, when the remainder of silica is present, mixing the resulting mixture with the remainder of silica, a reinforcing agent (e.g. carbon black, clay or talc), a vulcanizing agent, an antioxidant, a plasticizer and other compounding agents.

The present invention has been completed based on the above findings.

According to the present invention, there is provided a rubber composition comprising a diene rubber component and silica as reinforcing agent, wherein the diene rubber component is a hydroxyl group-containing diene rubber (A) having a weight-average molecular weight of 50,000 or more, or a blend of the hydroxyl group-containing diene rubber (A) and other diene rubber (B).

According to the present invention, there is also provided a process for producing a rubber composition by mixing a diene rubber component, silica as reinforcing agent, and other compounding agents, wherein the diene rubber component is a hydroxyl group-containing diene rubber (A) having a weight-average molecular weight of 50,000 or more or a combination of the hydroxyl group-containing diene rubber (A) and other diene rubber (B) and the mixing is conducted by mixing the diene rubber component with at least part of a required amount of silica and then mixing the resulting mixture with the remainder of silica and other compounding agents.

The present invention is hereinafter described in detail.

Hydroxyl Group-containing Diene Rubber (A)

In the present invention, there is used, as the diene rubber component, a hydroxyl group-containing diene rubber (A) having a weight-average molecular weight of 50,000 or more, or a combination of the hydroxyl group-containing diene rubber (A) and other diene rubber (B). The hydroxyl group-containing diene rubber (A) can be used in combination of two or more kinds. The other diene rubber (B) as well can be used in combination of two or more kinds.

The weight-average molecular weight of the hydroxyl group-containing diene rubber (A) is 50,000 or more, preferably 100,000–1,000,000, more preferably 100,000–800,000 in terms of standard polystyrene-reduced weight-average molecular weight (Mw) as measured by gel permeation chromatography (GPC). When the weight-average molecular weight is excessively small, it is impossible to obtain sufficient resilience, abrasion resistance, etc.

The hydroxyl group of the hydroxyl group-containing diene rubber (A) may be primary, secondary or tertiary hydroxyl group. In order to achieve improvements in resilience, abrasion resistance, tensile strength, etc. at higher levels, primary or secondary hydroxyl group is preferred with primary hydroxyl group being particularly preferred.

As the hydroxyl group-containing diene rubber (A), there can be used a copolymer of a hydroxyl group-containing vinyl monomer and a conjugated diene monomer, or a copolymer of a hydroxyl group-containing vinyl monomer, a conjugated diene monomer and other copolymerizable monomer. As the hydroxyl group-containing diene rubber (A), there can also be used a rubber obtained by reacting a (co)polymer of a conjugated diene monomer or a conjugated diene monomer and other copolymerizable monomer, containing a bound active metal in the molecule, with at least one compound (modifier) selected from a ketone, an ester, an aldehyde and an epoxy, to introduce a hydroxyl group(s) into the (co)polymer.

As the process for producing the hydroxyl group-containing diene rubber (A), there can be mentioned, for example, (1) a process (copolymerization process) which comprises copolymerizing a primary, secondary or tertiary hydroxyl group-containing vinyl monomer with a conjugated diene monomer or with a conjugated diene monomer and other copolymerizable monomer; and (2) a process (modification process) which comprises producing a diene polymer containing a bound active metal in the molecule by either of the following methods (a) and (b):
(a) a method of polymerizing a conjugated diene monomer or copolymerizing a conjugated diene monomer and other copolymerizable monomer, using an active metal-containing initiator, and
(b) a method of, in the first step, polymerizing a conjugated diene monomer or copolymerizing a conjugated diene monomer and other copolymerizable monomer and, in the second step, causing the (co)polymer obtained in the first step, to contain a bound active metal in the molecule, and then reacting the diene polymer with a modifier such as ketone, ester, aldehyde, epoxy or the like to introduce a primary, secondary or tertiary hydroxyl group(s) in the diene polymer.

The hydroxyl group-containing diene rubber (A) used in the present invention is a conjugated diene rubber having at least one hydroxyl group in the molecule. In producing the hydroxyl group-containing diene rubber (A) by the copolymerization process (1), the monomers are copolymerized so that the contents (based on the amounts bound) of the hydroxyl group-containing vinyl monomer, the conjugated diene monomer and the other copolymerizable monomer become ordinarily 0.05–30% by weight, 40–99.95% by weight and 0–59.95% by weight, respectively. In producing the hydroxyl group-containing diene rubber (A) by the modification process (2), for example, the monomers are (co)polymerized in the presence of an active metal-containing initiator so that the contents (based on the amounts bound) of the conjugated diene monomer and the other copolymerizable monomer become ordinarily 40–100% by weight and 0–60% by weight, respectively, or a diene polymer containing 40–100% by weight of a conjugated diene monomer and 0–60% by weight of other copolymerizable monomer is produced and then reacted with an active metal-containing initiator to bond the metal with the polymer; then, the polymer is modified with a modifier.

As the conjugated diene monomer, there can be mentioned, for example, 1,3-butadiene, 2-methyl-1,3-butadiene, 2,3-dimethyl-1,3-butadiene, 2-chloro-1,3-butadiene and 1,3-pentadiene. Of these, 1,3-butadiene, 2-methyl-1,3-butadiene, etc. are preferred with 1,3-butadiene being more preferred. These conjugated diene monomers can be used singly or in combination of two or more kinds.

The other copolymerizable monomer is not particularly restricted as long as it is copolymerizable with the conjugated diene monomer and does not impair the intended properties of the hydroxyl group-containing diene rubber (A) obtained, but is preferably an aromatic vinyl monomer. The aromatic vinyl monomer is exemplified by styrene, α-methylstyrene, 2-methylstyrene, 3-methylstyrene, 4-methylstyrene, 2,4-diisopropylstyrene, 2,4-dimethylstyrene, 4-tert-butylstyrene, 5-tert-butyl-2-methylstyrene, monochlorostyrene, dichlorostyrene and monofluorostyrene. Of these, styrene is preferred.

The micro structure of the conjugated diene unit in the hydroxyl group-containing diene rubber (A) is not particularly restricted and is appropriately selected depending upon the application purpose of the present rubber composition. The content of vinyl group (1,2-vinyl group and 3,4-vinyl group) in the conjugated diene unit is preferably selected in a range of, for example, 10% to less than 30% when improvements in resilience and abrasion resistance are desired, and in a range of 30–90% when improvement in wet skid resistance is desired.

When the hydroxyl group-containing diene rubber (A) contains aromatic vinyl monomer units (aromatic vinyl units), the chain distribution of the aromatic vinyl units is not particularly restricted, but is desirably such that the content of the independent chains each consisting of one aromatic vinyl unit is ordinarily 40% by weight or more, preferably 50% by weight or more, more preferably 55% by weight or more of the amount of bound aromatic vinyl and the content of the long chains each consisting of eight or more continuous aromatic vinyl units is ordinarily 5% by weight or less, preferably 2.5% by weight or less, more preferably 1.5% by weight or less of the amount of bound aromatic vinyl, because such a chain distribution can balance properties such as resilience, abrasion resistance, wet skid resistance and the like at a high level.

In producing the hydroxyl group-containing diene rubber (A) by the copolymerization process (1), a copolymer is produced from a hydroxyl group-containing vinyl monomer [i] and a conjugated diene monomer [ii] or from a hydroxyl group-containing vinyl monomer [i], a conjugated diene monomer [ii] and a monomer [iii] copolymerizable with the monomer [ii]. The contents of the individual monomers in the copolymer are appropriately selected depending upon the properties required for the hydroxyl group-containing diene rubber (A), but the ratio of the units of [i], the units of [ii] and the units of [iii] is ordinarily [0.05–30% by weight]:[40– 99.95% by weight]:[0–59.95% by weight], preferably [0.1–20% by weight]:[50–90% by weight]:[9.9–49.9% by weight], more preferably [0.3–15% by weight]:[60–85% by weight]:[14.7–39.7% by weight]. When the content of the units of the hydroxyl group-containing vinyl monomer [i] is excessively small, it is difficult to obtain sufficient improvements. Conversely, when the content is excessively large, the resulting rubber composition has a low balance of processability and resilience. Therefore, any of such contents is not preferred. The conjugated diene monomer [ii] and other copolymerizable monomer [iii] used in the process (1) are the same as mentioned above.

As the hydroxyl group-containing vinyl monomer, there is used a polymerizable monomer having at least one primary, secondary or tertiary hydroxyl group in the molecule. Such a hydroxyl group-containing vinyl monomer includes, for example, an unsaturated carboxylic acid monomer, a vinyl ether monomer, an aromatic vinyl monomer and a vinyl ketone monomer, all containing a hydroxyl group(s). Of these, a hydroxyl group-containing unsaturated carboxylic acid monomer is preferred. The hydroxyl group-containing unsaturated carboxylic acid monomer includes, for example, an ester, an amide, an anhydride and other derivative of an unsaturated carboxylic acid such as acrylic acid, methacrylic acid, itaconic acid, fumaric acid, maleic acid or the like. An acrylic acid ester, a methacrylic acid ester, etc. are preferred.

Specific examples of the hydroxyl group-containing vinyl monomer are hydroxymethyl (meth)acrylate, 2-hydroxyethyl (meth)acrylate, 2-hydroxypropyl (meth)acrylate, 3-hydroxypropyl (meth)acrylate, 3-chloro-2-hydroxypropyl (meth)acrylate, 3-phenoxy-2-hydroxypropyl (meth)acrylate, glycerol mono(meth)acrylate, hydroxybutyl (meth)acrylate, 3-chloro-2-hydroxypropyl (meth)-acrylate, hydroxyhexyl (meth)acrylate, hydroxyoctyl (meth)acrylate, hydroxymethyl(meth)acrylamide, 2-hydroxyethyl(meth) acrylamide, 2-hydroxypropyl(meth)-acrylamide, 3-hydroxypropyl(meth)acrylamide, di-(ethyl-ene glycol) itaconate, di-(propylene glycol) itaconate, bis(2-hydroxypropyl) itaconate, bis(2-hydroxyethyl) itaconate, bis (2-hydroxyethyl) fumarate, bis(2-hydroxy-ethyl) maleate, 2-hydroxyethyl vinyl ether, hydroxy-methyl vinyl ketone and allyl alcohol. Preferred are hydroxymethyl (meth) acrylate, 2-hydroxyethyl(meth)-acrylate, 2-hydroxypropyl (meth)acrylate, 3-hydroxy-propyl (meth)acrylate, 3-phenoxy-2-hydroxypropyl (meth)acrylate, glycerol mono (meth)acrylate, hydroxy-butyl (meth)acrylate, hydroxyhexyl (meth)acrylate, hydroxyoctyl (meth)acrylate, hydroxymethyl(meth)acryl-amide, 2-hydroxyethyl(meth) acrylamide, 2-hydroxypropyl-(meth)acrylamide, 3-hydroxypropyl(meth)acrylamide, etc. Of these, particularly preferred are hydroxymethyl (meth)acrylate, 2-hydroxyethyl (meth)acrylate, 3-hydro-xypropyl (meth) acrylate, etc. These hydroxyl group-containing vinyl monomers can be used singly or in combination of two or more kinds.

In producing the hydroxyl group-containing diene rubber (A) by the copolymerization process (1), the polymerization process used is not particularly restricted, but emulsion polymerization process is used ordinarily. The emulsion polymerization process can be an ordinary emulsion polymerization process. It is, for example, a process which comprises emulsifying and dispersing required amounts of the above-mentioned monomers in an aqueous medium in the presence of an emulsifier and conducting emulsion polymerization with a radical polymerization initiator.

As the emulsifier, there is used, for example, a salt of long chain (10 or more carbon atoms) fatty acid and/or a rosinate. Specific examples of the emulsifier are potassium or sodium salts of capric acid, lauric acid, myristic acid, palmitic acid, oleic acid, stearic acid or the like.

As the radical polymerization initiator, there are used, for example, persulfates such as ammonium persulfate, potassium persulfate and the like; and redox initiators such as ammonium persulfate/ferric sulfate combination, organic peroxide/ferric sulfate combination, hydrogen peroxide/ferric sulfate combination, and the like.

In order to control the molecular weight of the copolymer, a chain transfer agent may be added. As the chain transfer agent, there can be used, for example, mercaptans (e.g. tert-dodecylmercaptan and n-dodecylmercaptan), carbon tetrachloride, thioglycolic acid, diterpene, terpinolene and γ-terpinene.

The temperature of the emulsion polymerization can be appropriately selected depending upon the kind of the radical polymerization initiator used, but is ordinarily 0–100° C., preferably 0–60° C. The mode of polymerization may be any of continuous polymerization and batchwise polymerization.

In the emulsion polymerization, when the conversion becomes larger, gelation tends to appear. Therefore, the conversion is preferably set at 80% or less. It is particularly preferable to terminate the polymerization when the conversion reaches 40–70%. The termination of the polymerization is conducted ordinarily by adding a shortstop to the polymerization system when the conversion reaches a predetermined level. As the shortstop, there are used, for example, amine compounds such as diethylhydroxylamine, hydroxylamine and the like; quinone compounds such as hydroquinone, benzoquinone and the like; sodium nitrite; and sodium dithiocarbamate.

After the termination of the emulsion polymerization, the resulting polymer latex is as necessary subjected to removal of unreacted monomers. The resulting material is as necessary subjected to pH adjustment to a predetermined level by adding an acid (e.g. nitric acid or sulfuric acid). Thereto is added, as a coagulating agent, a salt (e.g. sodium chloride, calcium chloride or potassium chloride) to coagulate the formed polymer as crumbs. The crumbs are washed, dehydrated and dried with a band drier or the like, whereby an intended hydroxyl group-containing diene rubber (A) can be obtained.

In producing the hydroxyl group-containing diene rubber (A) by the modification process (2), first, a diene rubber containing a bound active metal in the molecule is produced. Then, the diene rubber is reacted with a modifier to modify the diene rubber to introduce a hydroxyl group(s) into the diene rubber. In the diene rubber, the amount of the conjugated diene monomer is ordinarily 40–100% by weight, preferably 50–90% by weight, more preferably 60–85% by weight, and the amount of the other copolymerizable monomer is ordinarily 0–60% by weight, preferably 10–50% by weight, more preferably 15–40% by weight.

As the active metal, there may be used those generally known in the technical field of diene rubbers. There can be mentioned, for example, alkali metals (e.g. lithium, sodium, potassium, rubidium and cesium), alkaline earth metals (e.g. beryllium, magnesium, calcium, strontium and barium), and lanthanide series rare earth metals (e.g. lanthanum and neodymium), all described in JP-A-58-162604, JP-A-61-42552, JP-B-5-30841, JP-A-63-297403, etc. Of these, alkali metals and alkaline earth metals are preferred with alkali metals being particularly preferred.

The diene rubber containing a bound active metal can be produced by using an active metal-based catalyst as an initiator and polymerizing a conjugated diene monomer or a conjugated diene monomer and other copolymerizable monomer by solution polymerization (JP-A-58-162604). As other production process, there can be mentioned a process which comprises producing a diene polymer by one of various polymerization processes (e.g. emulsion polymerization process and solution polymerization process) and then adding, in a post-reaction, an active metal to the chain of the diene polymer (JP-A-58-189203). Needless to say, production of the diene rubber containing a bound active metal is not restricted to these processes.

As the active metal-based catalyst (active metal-containing initiator), there are used an organic alkali metal catalyst, an organic alkaline earth metal catalyst, an organic lanthanide series rare earth metal catalyst, etc.

The organic alkali metal catalyst includes, for example, organic monolithium compounds such as n-butyl lithium, sec-butyl lithium, tert-butyllithium, hexyllithium, phenyllithium, stilbenelithium and the like; polyfunctional organic lithium compounds such as dilithiomethane, 1,4-dilithiobutane, 1,4-dilithio-2-ethylcyclohexane, 1,3,5-trilithiobenzene and the like; sodium naphthalene; and potassium naphthalene. Of these, organic lithium compounds are preferred with organic monolithium compounds being particularly preferred.

The organic alkaline earth metal includes, for example, n-butylmagnesium, n-hexylmagnesium, ethoxy-calcium, calcium stearate, tert-butoxystrontium, ethoxy-barium, isopropoxybarium, ethylmercaptobarium, tert-butoxybarium, phenoxybarium, diethylaminobarium, barium stearate and ethylbarium.

The organic lanthanide series rare earth metal catalyst includes, for example, a neodimium versatate/triethylaluminum/aluminum/ethylaluminum sesquichloride composite catalyst as described in JP-B-63-64444.

These active metal-containing initiators can be used singly or in combination of two or more kinds. In solution polymerization (anionic polymerization), the amount of the active metal-containing initiator used is appropriately selected depending upon the kind of the initiator or the required molecular weight of the polymer formed, and is ordinarily 1–20 mM, preferably 2–15 mM, more preferably 3–10 mM per kg of the diene rubber formed.

The anionic polymerization using the above initiator is conducted in a hydrocarbon solvent which does not destroy the initiator. An appropriate hydrocarbon solvent is not particularly restricted as long as it is usable in ordinary anionic polymerization, and is selected from well-known hydrocarbon solvents such as aliphatic hydrocarbons (e.g. n-butane, n-pentane, iso-pentane, n-hexane, n-heptane and isooctane), alicyclic hydrocarbons (e.g. cyclopentane, cyclohexane and methyl-cyclopentane), aromatic hydrocarbons (e.g. benzene and toluene) and the like. n-Hexane, cyclohexane, benzene, etc. are preferred. As necessary, an unsaturated hydro-carbon of low polymerizability (e.g. 1-butene, cis-2-butene or 2-hexene) may be used. These hydrocarbon solvents are used singly or in combination of two or more kinds, ordinarily in such an amount that the concentration of monomers becomes 1–30% by weight.

In the anionic polymerization reaction, in order to control the micro structure of conjugated diene monomer unit or the distribution of the aromatic vinyl monomer (to be copolymerized with the conjugated diene monomer) in the chain of the copolymer obtained, there may be added, to the reaction system, a polar compound such as ether (e.g. tetrahydrofuran, diethyl ether, dioxane, ethylene glycol dimethyl ether, ethylene glycol dibutyl ether, diethylene glycol dimethyl ether or diethylene glycol dibutyl ether), tertiary amine compound (e.g. tetramethylethyleneamine, trimethylamine, triethylamine, pyridine or quinuclidine), alkali metal alkoxide compound (e.g. potassium tert-amyl oxide or potassium tert-butyl oxide), phosphine compound (e.g. triphenylphosphine) or the like. These polar compounds are used singly or in combination of two or more kinds, in an amount of ordinarily 0–200 moles per mole of the initiator.

The anionic polymerization reaction is conducted ordinarily at −78° C. to 150° C. batchwise or continuously. When an aromatic vinyl monomer is copolymerized, it is desirable for improvement of the randomness of aromatic vinyl unit in formed polymer to continuously or intermittently feed, into the reaction system, a conjugated diene monomer or a mixture of a conjugated diene monomer and an aromatic vinyl monomer so that the proportions of aromatic vinyl monomer and conjugated diene monomer in formed polymer fall in a particular range, in accordance with a method, for example, disclosed in JP-A-59-140211 or JP-A-56-143209.

Specific examples of the polymer formed by anionic polymerization can be a polybutadiene, a poly-isoprene, a butadiene-isoprene copolymer, a styrene-butadiene copolymer, a styrene-isoprene copolymer and a styrene-butadiene-isoprene copolymer. There can thus be obtained a conjugated diene polymer having a bound active metal at the terminal of the polymer chain (this polymer is hereinafter referred to as active polymer).

In the process wherein an active metal is added in a post-reaction (active metal post-addition reaction), addition of active metal is conducted, for example, by adding, to the above-obtained active polymer, an equimolar amount of an alcohol (e.g. methanol or isopropanol) to terminate the polymerization reaction and then freshly adding an active metal-containing initiator and, as necessary, the above-mentioned polar compound to give rise to a reaction. The reaction temperature is ordinarily −78° C. to 150° C., preferably 20–100° C.; and the reaction time is ordinarily 0.1–24 hours, preferably 0.5–4 hours. There can thus be obtained an active polymer having a bound active metal in the polymer main chain. By using a conjugated diene polymer obtained by other polymerization process such as emulsion polymerization or the like and by reacting the polymer with an active metal-containing initiator in the same manner as mentioned above, an active metal can be introduced into the polymer molecular chain.

There is no particular restriction as to the modifier used, as long as the modifier can react with the active metal to form hydroxyl group. The modifier can be specifically a ketone, an ester, an aldehyde, an epoxy or the like. Of these, an epoxy having an epoxy ring structure at the molecular end is particularly preferable because it can form primary hydroxyl group. These modifiers can be used singly or in combination of two or more kinds.

The ketone includes, for example, acetone, benzophenone, aminoacetone, aminobenzophenone and acetylacetone.

The ester includes, for example, methyl acetate, methyl adipate, ethyl adipate, methyl methacrylate and ethyl methacrylate.

The aldehyde includes, for example, benzaldehyde and pyridinealdehdye.

The epoxy includes, for example, a compound represented by the general formula (1):

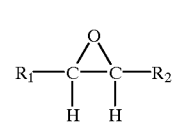

(1)

(wherein $R_1$ and $R_2$ are each independently a hydrogen atom or a substituted or unsubstituted hydrocarbon group, and $R_1$ and $R_2$ may bond to each other to form a cyclic structure). An epoxy of the general formula (1) wherein at least either of $R_1$ and $R_2$ is a hydrogen atom, is preferred. The carbon atoms of the substituted or unsubstituted hydrocarbon group are ordinarily 20 or less, preferably 1–10, more preferably 1–6. Specific examples of the substituted or unsubstituted hydrocarbon group are alkyl group, alkenyl group, alkynyl group, cycloalkyl group, aryl group, aralkyl group, alkoxyalkyl group, dialkylaminoalkyl group, diarylaminoalkyl group, trialkoxysilylalkyl group and trialkylsilylalkyl group. The cyclic structure formed by bonding of $R_1$ and $R_2$ includes cycloalkyl group, etc. Of these, preferred are alkyl group, alkenyl group, aryl group, alkoxyalkyl group, dialkylaminoalkyl group, diarylaminoalkyl group, trialkoxysilylalkyl group and trialkylsilylalkyl group. Particularly preferred is alkyl group.

Specific examples of the epoxy are ethylene oxide, propylene oxide, 1,2-epoxybutane, 1,2-epoxyisobutane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxycyclopentane, 1,2-epoxycyclohexane, 1,2-epoxycyclododecane, 1,2-epoxyethylbenzene, 1,2-epoxy-1-methoxy-2-methylpropane, glycidyl methyl ether, glycidyl ethyl ether, glycidyl isopropyl ether, glycidyl allyl ether, glycidyl phenyl ether, glycidyl butyl ether, 2-(3,4-epoxycyclohexyl)-ethyltrimethoxysilane and 3-glycidyloxypropyltrimethoxysilane. Of these, preferred are ethylene oxide, propylene oxide, 1,2-epoxybutane, 1,2-epoxyisobutane, 2,3-epoxybutane, 1,2-epoxyhexane, 3,4-epoxy-1-butene, 1,2-epoxy-5-hexene, glycidyl methyl ether, glycidyl ethyl ether, glycidyl isproyl ether, glycidyl allyl ether, glycidyl phenyl ether, glycidyl butyl ether and 3-glycidyloxypropyltrimethoxysilane. Particularly preferred are epoxy-terminated compounds such as ethylene oxide, propylene oxide, 1,2-epoxybutane, 1,2-epoxy-isobutane, 1,2-epoxyhexane and the like.

The epoxy includes also an epihalohydrin, i.e. a compound formed by substituting at least one hydrogen atom of the above-mentioned epoxy with a halogen atom(s). A preferred range of the epihalohydrin and the examples of its hydrocarbon group are the same as mentioned above with respect to the epoxy. Specific examples of the epihalohydrin are epichlorohydrin, epibromohydrin, epilodohydrin, 2,3-epoxy-1,1,1-trifluoropropane and 1,2-epoxy-1H, 1H, 2H, 3H, 3H-heptadecafluoroundecane. Preferred are epichlorohydrin, epibromohydrin, etc.

The amount of the modifier used is appropriately selected depending upon the kind of the modifier and the properties required for the hydroxyl group-containing diene rubber (A) formed, but is generally 0.1–10 moles, preferably 0.5–5 moles, more preferably 1–1.5-moles per mole of the active metal.

The modification reaction is conducted by contacting the active polymer containing a bound active metal in the molecule, with the modifier. When the active polymer has been produced by anionic polymerization, the modification reaction is conducted ordinarily by adding a required amount of the modifier to the active polymer solution before polymerization termination. Both of terminal modification and main chain modification may be conducted. In this case, an active metal is introduced into the main chain of a conjugated diene polymer whose terminal has been modified with a modifier, after which the resulting polymer is reacted with a modifier. The reaction temperature and time employed in the modification reaction can be selected in wide ranges, but generally room temperature to 120° C. and several seconds to several hours.

The hydroxyl group-containing diene rubber (A) used in the present invention may be one produced by a process other than the process (1) and the process (2). As the hydroxyl group-containing diene rubber (A) of the present invention, there can be used, for example, rubbers produced by known processes such as a process which comprises reacting an epoxidized diene rubber with an alcohol to introduce hydroxyl group into the rubber (JP-A-60-53511), a process which comprises heating an epoxidized polybutadiene in the presence of an amine and a carboxylic acid to open the epoxy ring of the polymer (JP-A-60-53512, JP-A-60-55004 and JP-A-61-148205), a process which comprises oxidizing a diene borate rubber with hydrogen peroxide or the like in an alkaline state to allow the rubber to have hydroxyl group (JP-A-4-45104), a process which comprises copolymerizing a halogen-containing monomer (e.g. 1-chlorobutadiene) to produce a halogenated butadiene-styrene rubber and hydrolyzing the rubber in an alkaline state (JP-A-3-174408), and so forth.

Other Diene Rubber (B)

The hydroxyl group-containing diene rubber (A) can be used alone as the diene rubber component of the present rubber composition, but may be used in combination with the other diene rubber (B). When the other diene rubber (B) is used in combination, the proportion of the hydroxyl group-containing diene rubber (A) in the diene rubber component is appropriately selected so as to meet the application and purpose of the rubber composition obtained, but is ordinarily 10% by weight or more, preferably 20–80% by weight. That is, (A):(B)=10–100:90–0, preferably 20–80:20–80, more preferably 30–70:70–30 (weight ratio). When the proportion of the hydroxyl group-containing diene rubber (A) used is too small, no sufficient improvements are obtained, and such a proportion is not preferable.

The other diene rubber (B) includes, for example, natural rubber (NR), polyisobutylene rubber (IR), styrene-butadiene copolymer rubber (SBR) obtained by emulsion polymerization, random SBR obtained by solution polymerization (content of bound styrene=5–50% by weight, 1,2-content in butadiene unit=10–80%), high-trans SBR (trans content in butadiene unit=70–95%), low-cis-polybutadiene rubber (BR), high-cis BR, high-trans BR (trans content in butadiene unit=70–95%), styrene-isoprene copolymer rubber (SIR), butadiene-isoprene copolymer rubber, random styrene-butadiene-isoprene copolymer rubber (SIBR) obtained by solution polymerization, SIBR obtained by emulsion polymerization, styrene-acrylonitrile-butadiene copolymer rubber obtained by emulsion polymerization, acrylonitrile-butadiene copolymer rubber, high-vinyl SBR-low-vinyl SBR block copolymer rubber and polystyrene-polybutadiene-polystyrene block copolymer rubber. An appropriate diene rubber (B) is selected from the above rubbers depending upon the properties required for the diene rubber component. These diene rubbers are used singly or in combination of two or more kinds. Of them, preferred are NR, BR, IR, SBR, SIBR. etc. and particularly preferred from the standpoint of processability are NR and IR.

When the diene rubber component is a combination of the hydroxyl group-containing diene rubber (A) and the other diene rubber (B), the diene rubber component preferably has such a composition of [hydroxyl group-containing diene rubber (A)]:[NR and/or IR]=20–80:80–20, preferably 30–70:70–30 (weight ratio), or [hydroxyl group-containing diene rubber (A)]:[NR and/or IR]:[SBR]=80–20:10–70:10–70 (weight ratio).

Silica

The silica used in the present invention is one generally used in general-purpose rubbers. Specific examples are dry method white carbon generally used as a reinforcing agent, wet method white carbon, colloidal silica, and precipitated silica disclosed in JP-A-62-62838. Preferred is wet method white carbon composed mainly of hydrated silica.

The silica is preferably in an acidic range to obtain improved dispersion. Silica treated with a coupling agent or the like may also be used.

The specific surface area of silica is not particularly restricted but is ordinarily 50–400 $m^2$/g, preferably 100–250 m²/g, more preferably 120–190 m²/g. When the specific surface area is too small, the silica is inferior in reinforcing ability. Conversely, when the specific surface area is too large, the resulting rubber composition is inferior in processability and is not sufficiently improved in abrasion resistance or resilience.

The proportion of silica used is not particularly restricted but is ordinarily 20–150 parts by weight, preferably 40–120 parts by weight per 100 parts by weight of the diene rubber component. When the proportion of silica used is too small, the silica is inferior in reinforcing ability. Conversely, when the proportion of silica used is too large, the resulting unvulcanized rubber composition has too high a viscosity and is inferior in processability.

As the coupling agent, there can be preferably used a silane coupling agent. The silane coupling agent may be one of various known silane coupling agents. Representative examples thereof are γ-mercaptopropyl-trimethoxysilane (A 189, a product of Union Carbide Corp.), γ-aminopropyltriethoxysilane (A 1100, a product of Union Carbide Corp.) and bis[3-triethoxysilyl)propyl] tetrasulfide (Si-69, a product of Degussa, Inc.). The proportion of the silane coupling agent used is ordinarily 0.01–30 parts by weight, preferably 0.1–15 parts by weight per 100 parts by weight of the rubber component.

Rubber Composition

The rubber composition of the present invention can be obtained by kneading individual components according to an ordinary method. The present rubber composition can be obtained by kneading the diene rubber component, silica and other compounding agents such as vulcanizing agent, vulcanization accelerator, antioxidant, plasticizer, lubricant, filler and the like, in respective necessary amounts, according to an ordinary method.

These compounding agents are those generally used in the rubber industry and include, for example, vulcanizing agents such as sulfur, peroxide and the like; vulcanization accelerators such as thiazole type, thiuram type, sulfenamide type, guanidine type and the like; vulcanization activators such as stearic acid, zinc oxide and the like; coupling agents such as silane coupling agent and the like; activating agents such as diethylene glycol, polyethylene glycol, organic silica compound and the like; reinforcing agents such as particular grade carbon black (e.g. FEF, HAF, ISAF or SAF), calcium carbonate and the like; plasticizers; fillers such as thermal black, acetylene black, graphite, clay, talc and the like; antioxidants; and process oils. From these can be appropriately selected necessary compounding agents so as to meet the purpose, application, etc. of the rubber composition obtained.

In kneading individual components, first, the diene rubber component and silica are mixed by the use of a mixer such as roll, Banbury mixer or the like; then, other compounding agents are mixed, whereby a rubber composition improved in dispersion and superior in properties can be obtained. At that time, silica may be added in one portion, but addition of a required amount of silica in two or more times gives easier dispersion and makes easier the mixing of silica and the diene rubber component. For example, 10–90% by weight of total silica can be added in the first mixing and the remainder of silica can be added in the second and later mixing.

Of the above-mentioned other compounding agents, the silane coupling agent, the activating agent, etc. may be added as necessary at the first mixing of the diene rubber component and silica; however, the other compounding agents are preferably added in the second and later mixing steps. Addition of the compounding agents other than the silane coupling agent and the activating agent at the first mixing of the diene rubber component and silica requires a longer mixing time and further, in some cases, reduces the reinforcing ability of silica.

The temperature employed in mixing of the diene rubber component and silica is ordinarily 80–20° C., preferably 100–190° C., more preferably 140–180° C. When the temperature is too low, improvement in abrasion resistance is small. Conversely, when the temperature is too high, there appears the scorch of the diene rubber component. Therefore, none of these temperatures is preferable. The mixing time is ordinarily 30 seconds or more, preferably 1–30 minutes.

Industrial Applicability

According to the present invention, there is provided a silica-containing rubber composition which is significantly improved in tensile strength and abrasion resistance (these properties have been problems of conventional silica-containing rubber composition) without impairing the resilience (this is a feature of silica-containing rubber composition) and yet which has excellent hardness property, processability, etc. Owing to these properties, the present rubber composition can be used in various applications, for example, as a material for production of automobile tire, automobile part, hose, window frame, belt, shoe sole, rubber vibration insulator, etc., or as a toughening rubber for resins such as impact-resistant polystyrene, ABS resin and the like.

The rubber composition of the present invention is excellent particularly as a rubber material for the tread portion of low-fuel-consumption tire and also suitable as a rubber material for the tread, side wall, undertread, carcass, bead, etc. of all-season tire, high-performance tire or studless tire.

BEST MODE FOR CARRYING OUT THE INVENTION

The present invention is hereinafter described more specifically with reference to Production Examples, Examples and Comparative Examples. In these Examples, parts and % are by weight unless otherwise specified.

Measurement of various properties and the micro structure of polymer was made according to the following test methods.

(1) Content of bound styrene in polymer and vinyl content in butadiene unit

Were measured by infrared spectroscopy (Hampton method).

(2) Content of hydroxyl group-containing monomer in polymer

Was determined by treating a polymer with phenyl isocyanate and quantitatively determining the phenyl group of phenyl isocyanate using $^{13}$C-NMR spectrum, according to the method described in JP-A-3-174408.

(3) Molecular weight of polymer

Was measured by GPC and expressed as standard polystyrene-reduced weight-average molecular weight.

(4) Distribution of styrene chains

A polymer was subjected to ozone decomposition and then to GPO, and the amount of independent styrene chains each consisting of one styrene unit and the amount of long styrene chains each consisting of eight or more continuous styrene units were calculated, according to the method described in Preprint Vol. 29, No. 9, p. 2055 of the Society of Polymer Science, Japan.

(5) Resilience

Was measured at 60° C. by the use of a Lüpke rebound resilience tester according to JIS K 6301.

(6) Abrasion resistance

Was measured by the use of a Pico abrasion tester according to ASTM D 2228. This property was expressed by an index (a Pico abrasion index).

(7) Mooney viscosity

Was measured according to JIS K 6301.

(8) Processability

Was measured by observing windability round a roll and evaluating the result based on the following standard.

| | |
|---|---|
| ⊚: | Winds tightly round a roll. |
| ○: | Bugging occurs slightly. |
| Δ: | Winds round a roll but bugging occurs frequently. |
| X: | Winding occurs rarely. |

Production Example 1

Copolymerization Process

Into a tank equipped with a stirrer were fed 200 parts of water, 3 parts of a rosinate soap, 0.2 part of tert-dodecylmercaptan and the monomers having a composition shown in Table 1. The temperature of the reactor was set at 5° C.; there were added, as a radical polymerization initiator, 0.1 part of cumene hydro-peroxide, 0.2 part of sodium formaldehyde sulfoxylate and 0.01 part of ferric sulfate; and polymerization was initiated. When the conversion reached 60%, diethyl-hydroxylamine was added to terminate the reaction. Then, unreacted monomers were recovered, and the formed polymer was coagulated using sulfuric acid and a salt, to obtain crumbs. The crumbs were dried using a crumb dryer to obtain diene rubbers No. 1 to No. 8. The properties of the polymers are shown in Table 1.

completion of the reaction, 20 mM of methanol was added as a shortstop, and 20 g of 2,6-di-tert-butylphenol was added. Then, the formed polymer was recovered by steam stripping to obtain a diene rubber No. 9. Similarly, diene rubbers No. 12 to No. 16 were obtained under the polymerization conditions shown in Table 2. The properties of these polymers are shown in Table 2. Incidentally, in the diene rubber No. 15, aminostyrene (AST) was used as a modifier for amino group formation.

Production Example 3

Modification Process: Main Chain Modification

Into an autoclave equipped with a stirrer were placed 8,000 g of cyclohexane, 460 g of styrene and 700 g of butadiene. Further, 3.5 mM of TMEDA and 11 mM of n-butyllithium were placed. Polymerization was initiated at 50° C. After 10 minutes from the initiation of polymerization, the remainder (840 g) of butadiene was added continuously. After it was confirmed that the conversion reached 100%, methanol was added in an amount equimolar to the living terminal (Li) to terminate the polymerization. To the solution were added 60 mM of sec-butyllithium and 60 mM of TMEDA, and a reaction was conducted at 70° C. for 1 hour. Then, 60 mM of ethylene oxide (EO) was added and stirring was conducted for 20 minutes. 120 mM of methanol was added to terminate the reaction. The formed polymer was recovered in the same manner as in Production Example 2 to obtain a diene rubber No. 10. The properties of the polymer are shown in Table 2.

TABLE 1

| Diene rubber No. | 1 | 2 | 3 | 4 | 5 | 6 | 7 | 8 |
|---|---|---|---|---|---|---|---|---|
| Amount of butadiene fed (parts) | 69 | 69 | 69.7 | 69 | 70 | 69 | 69 | 71 |
| Amount of styrene fed (parts) | 28 | 28 | 30 | 28 | 20 | 28 | 28 | 29 |
| Amount of HA (1) fed (parts) | 3 | — | — | — | — | — | — | — |
| Amount of HEA (2) fed (parts) | — | 3 | — | — | — | — | — | — |
| Amount of HEMA (3) fed (parts) | — | — | 0.3 | 3 | 10 | — | — | — |
| Amount of GOHMA (4) fed (parts) | — | — | — | — | — | 3 | — | — |
| Amount of DMAPAA (5) fed (parts) | — | — | — | — | — | — | 3 | — |
| Amount of bound styrene (wt. %) | 20.7 | 20.1 | 23.2 | 20.8 | 14.0 | 21.3 | 21.3 | 23.2 |
| Amount of bound HA (1) (wt. %) | 4.8 | — | — | — | — | — | — | — |
| Amount of bound HEA (2) (wt. %) | — | 5.3 | — | — | — | — | — | — |
| Amount of bound HEMA (3) (wt. %) | — | — | 0.5 | 3.7 | 11.5 | — | — | — |
| Amount of bound GOHMA (4) (wt. %) | — | — | — | — | — | 2.6 | — | — |
| Amount of bound DMAPAA (5) (wt. %) | — | — | — | — | — | — | 2.6 | — |
| Weight-average molecular weight (Mw × 10$^{-4}$) | 44.8 | 42.2 | 43.6 | 46.9 | 47.3 | 45.2 | 44.3 | 46.8 |

Footnotes
(1) HA: 2-Hydroxypropyl acrylate
(2) HEA: 2-Hydroxyethyl acrylate
(3) HEMA: 2-Hydroxyethyl methacrylate
(4) GOHMA: Glycerol monomethacrylate
(5) DMAPAA: Dimethylaminopropylacrylamide

Production Example 2

Modification Process: Terminal Modification

Into an autoclave equipped with a stirrer were placed 8,000 g of cyclohexane, 400 g of styrene and 800 g of butadiene. Further, 10 mM of tetramethylethylene-diamine (TMEDA) and 10 mM of n-butyllithium were placed. Polymerization was initiated at 40° C. After 10 minutes from the initiation of polymerization, the remainder (800 g) of butadiene was added continuously. After it was confirmed that the conversion reached 100%, ethylene oxide (EO) was added in an amount equimolar to the living terminal (Li), and a reaction was conducted for 20 minutes. After the

Production Example 4

Modification Process: Terminal Modification+Main Chain Modification

Into an autoclave equipped with a stirrer were placed 8,000 g of cyclohexane, 310 g of styrene and 600 g of butadiene. Further, 4 mM of TMEDA and 12 mM of n-butyllithium were placed. Polymerization was initiated at 50° C. After 10 minutes from the initiation of polymerization, the remainder (1,090 g) of butadiene was added continuously. After it was confirmed that the conversion reached 100%, propylene oxide (PO) was added in an amount equimolar to the living terminal (Li), and a reaction was conducted for 20 minutes. To the solution were added 60 mM of sec-butyllithium and 60 mM of TMEDA, and a reaction was conducted at 70° for 1 hour. Then, 60 mM of ethylene oxide (EO) was added and a reaction was conducted for 20 minutes. 120 mM of methanol was added to terminate the reaction. The formed polymer was recovered in the same manner as in Production Example 2 to obtain a diene rubber No. 11. The properties of the polymer are shown in Table 2.

TABLE 2

| Diene rubber No. | 9 | 10 | 11 | 12 | 13 | 14 | 15 | 16 |
|---|---|---|---|---|---|---|---|---|
| Polymerization conditions | | | | | | | | |
| Amount of styrene fed (g) | 400 | 460 | 310 | 400 | 0 | 420 | 400 | 400 |
| Amount of butadiene fed (g) | 800 | 700 | 600 | 800 | 2000 | 700 | 800 | 800 |
| Amount of butadiene after-added (g) | 800 | 840 | 1090 | 800 | 0 | 880 | 800 | 800 |
| Temperature (minimum) (° C.) | 40 | 50 | 50 | 40 | 60 | 40 | 40 | 40 |
| Temperature (maximum) (° C.) | 60 | 70 | 70 | 60 | 80 | 60 | 60 | 60 |
| Amount of n-butyllithium (mmol) | 10 | 11 | 12 | 20 | 25 | 22 | 20 | 10 |
| TMEDA (mol) | 10 | 3.5 | 4 | 15 | 0.2 | 6 | 15 | 10 |
| Polymer properties | | | | | | | | |
| Amount of bound styrene (wt. %) | 20.5 | 23.1 | 15.5 | 20.4 | — | 21.5 | 20.5 | 21.4 |
| Amount of 1,2-vinyl (wt. %) | 62.5 | 33.5 | 32.1 | 63.0 | 9.8 | 59.3 | 62.1 | 62.0 |
| Styrene independent chains (wt. %) | 88.0 | 90.0 | 91.0 | 89.0 | — | 90.0 | 89.0 | 89.0 |
| Styrene long chains (wt.%) | 0.1 | 0.2 | 0.1 | 0.1 | — | 0.2 | 0.1 | 0.1 |
| Weight-average molecular weight (Mw × $10^{-4}$) | 33.5 | 29.9 | 28.6 | 16.7 | 14.8 | 15.0 | 16.7 | 33.5 |
| Modifiers (*) | | | | | | | | |
| Terminal-modifying reaction | EO | — | PO | PO | EO | BPH | AST | — |
| Main chain-modifying reaction | — | PO | EO | — | — | — | — | — |

Footnotes
(*) Modifiers
EO: Ethylene oxide
PO: Propylene oxide
BPH: Benzophenone
AST: Aminostyrene

EXAMPLES 1–6 AND COMPARATIVE EXAMPLE 1

Using, as a raw material rubber, one of the diene rubbers produced in Production Examples 1 and, as silica, Ultrasil VN3G (a product of Degussa, Inc. having a specific surface area of 175 m²/g), the following test was conducted based on the compounding 1 shown in Table 3. In a 250-ml Brabender type mixer, the first-time mixing operation was conducted by mixing a total amount (100 parts) of a raw material rubber and part (35 parts) of silica at 160° C. for 2 minutes (no silane coupling agent was used); then, the second-time mixing operation was conducted by adding the remainder (25 parts) of silica, a plasticizer (10 parts), zinc oxide (5 parts), stearic acid (2 parts) and an antioxidant (1 part) and conducting kneading at the same temperature for 2.5 minutes; and the third-time mixing operation was conducted by kneading the resulting mixture together with sulfur (2 parts) and a vulcanization accelerator (2 parts) in an open roll of 50° C. Each of the resulting kneaded products was subjected to press vulcanization at 160° C. for 30 minutes, and test pieces were prepared and measured for properties. The results are shown in Table 4.

TABLE 3

| | Compounding 1 | | | Compounding 2 | |
|---|---|---|---|---|---|
| Mixing style | 1st time | 2nd time | 3rd time | 1st time | 2nd time |
| Raw material rubber | 100 | — | — | 100 | — |
| Silica (1) | 35 | 25 | — | 60 | — |
| Silane coupling agent (2) | varied | — | — | — | — |
| Plasticizer (aromatic oil) | — | 10 | — | 10 | — |
| Zinc oxide (#1) | — | 5 | — | 5 | — |
| Stearic acid | — | 2 | — | 2 | — |
| Antioxidant (3) | — | 1 | — | 1 | — |
| Sulfur #325 | — | — | 2 | — | 2 |
| Vulcanizing accelerator (4) | — | — | 2 | — | 2 |

Footnotes
(1) Ultrasil VN3G (a product of Degussa, Inc.) or Nipsil AQ (a product of Nippon Silica Industrial Co., Ltd.)
(2) Si 69 (a product of Degussa, Inc.)
(3) NOCRAC 6C (a product of Ouchi Skinko Chemical Industrial Co., Ltd.)
(4) NOCCELER CZ (a product of Ouchi Skinko Chemical Industrial Co., Ltd.)

TABLE 4

|  | Examples | | | | | | Comparative Example |
|---|---|---|---|---|---|---|---|
|  | 1 | 2 | 3 | 4 | 5 | 6 | 1 |
| Diene rubber No. | 1 | 2 | 3 | 4 | 5 | 6 | 8 |
| Tensile strength (Kg/cm$^2$) | 190 | 236 | 200 | 241 | 209 | 233 | 172 |
| Elongation (%) | 520 | 480 | 730 | 460 | 310 | 450 | 820 |
| Hardness test (JIS) 23° C. | 69 | 68 | 64 | 69 | 73 | 69 | 68 |
| Resilience (%) 60° C. | 56 | 60 | 58 | 63 | 65 | 62 | 53 |
| Pico abrasion index | 110 | 120 | 115 | 138 | 165 | 132 | 110 |
| Compound ML$_{1+4}$, 100° C. | 87 | 89 | 74 | 89 | 98 | 96 | 91 |
| Roll processability | ⊚ | ⊚ | ⊚ | ⊚ | ⊚ | ⊚ | ⊚ |

As is clear from the results of Table 4, the rubber compositions (Examples 1–6) each using, as the diene rubber component, a hydroxyl group-containing diene rubber show no increase in hardness or compound Mooney viscosity, are superior in roll processability, and are sufficiently improved in tensile strength, resilience and abrasion resistance. Further, the cases using the primary hydroxyl group-containing diene rubbers (Examples 2–6), as compared with the case using the secondary hydroxyl group-containing diene rubber (Example 1), shows large improvements in strength property, resilience and abrasion property.

EXAMPLES 7–9 AND COMPARATIVE EXAMPLES 2–4

By conducting a test based on the compounding 1 or 2 shown in Table 3, in the same manner as in Example 1, there were studied the effects of the use of silane coupling agent, the method of kneading, the kind of silica, the polar group (hydroxyl group and tertiary amino group) of diene rubber, etc. Incidentally, in the compounding 2, first, the first-time mixing operation was conducted by kneading a raw material rubber (100 parts), silica (60 parts), a plasticizer (10 parts), zinc oxide (5 parts), stearic acid (2 parts) and an antioxidant (1 part) at 160° C. for 4.5 minutes in a Brabender type mixer; and then, the second-time mixing operation was conducted by kneading the resulting mixture together with sulfur (2 parts) and a vulcanization accelerator (2 parts) in an open roll of 50° C. Each of the resulting kneaded products was subjected to press vulcanization at 160° C. for 30 minutes, and test pieces were prepared and measured for properties. The kind of each diene rubber used, the amount of the silane coupling agent used, each compounding recipe used, and the test results obtained are shown in Table 5. Incidentally, in Table 5, the data of Example 4 appearing in Table 4 are shown again for comparison.

TABLE 5

|  | Examples | | | | Comparative Example | | | |
|---|---|---|---|---|---|---|---|---|
|  | 7 | 4 | 8 | 9 | 2 | 3 | 4 | 5 |
| Diene rubber No. | 3 | 4 | 4 | 4 | 8 | 8 | 8 | 7 |
| Silica (1) | VN | VN | VN | AQ | VN | VN | AQ | AQ |
| Silane coupling agent (parts) | 1 | — | — | — | 1 | 3 | — | — |
| Compounding No. | 1 | 1 | 2 | 2 | 1 | 1 | 2 | 2 |
| Tensile strength (Kg/cm$^2$) | 200 | 241 | 196 | 190 | 186 | 200 | 166 | 168 |
| Elongation (%) | 480 | 460 | 480 | 420 | 560 | 490 | 820 | 380 |
| Hardness test (JIS) 23° C. | 69 | 69 | 72 | 73 | 69 | 70 | 70 | 75 |
| Resilience (%) 60° C. | 60 | 63 | 60 | 58 | 55 | 58 | 51 | 60 |
| Pico abrasion index | 119 | 138 | 125 | 120 | 106 | 124 | 100 | 113 |
| Compound ML$_{1+4}$, 100° C. | 66 | 89 | 95 | 113 | 72 | 68 | 160 | 172 |
| Roll processability | ⊚ | ⊚ | ⊚ | ◯ | ⊚ | ⊚ | X | X |

Footnotes
(1) Silica
VN: Ultrasil VN3G (a product of Degussa, Inc.)
AQ: Nipsil AQ (a product of Nippon Silica Industrial Co., Ltd.)

As is clear from the results of Table 5, when a hydroxyl group-free diene rubber is used (Comparative Example 2 and 3), even addition of 3 parts by weight of a silane coupling agent (which is expensive) shows substantially no sufficient improvement in resilience, and addition of 1 part by weight of the silane coupling agent shows no improvement in resilience. Meanwhile, when a diene rubber containing 0.5% by weight of hydroxyl group-containing monomer units is used (Example 7), addition of only 1 part by weight of the silane coupling agent shows significant improvement in resilience and sufficient improvements in properties such as tensile strength, abrasion resistance and the like.

As to the kneading method, it is clear from the comparison of Example 4 and Example 8 that the method of first kneading a diene rubber and at least part of silica and then adding compounding agents other than sulfur and vulcanization accelerator, followed by kneading (the compounding 1) shows higher improvements in all properties, than the method of kneading a diene rubber together with all compounding agents other than sulfur and vulcanization accelerator, in one time (the compounding 2).

It is clear that use of a silica having a small specific surface area (Ultrasil VN3G used in Example 8 has a specific surface area of 175 m$^2$/g) gives larger improvements and larger effects particularly on compound Mooney viscosity and roll processability, than use of a silica having a large specific surface area (Nipsil AQ used in Example 9 has a specific surface area of 200 m$^2$/g).

It is clear that use of a tertiary amino group-containing diene rubber (Comparative Example 5) gives improvements in resilience and abrasion resistance, but gives an extremely high compound Mooney viscosity and inferior results in processability, hardness property, tensile strength, etc.

EXAMPLES 10–13 AND COMPARATIVE EXAMPLES 5–6

Using some of the hydroxyl group-containing diene rubbers produced by solution polymerization in Production Example 2, the same tests as in Example 1 and Example 8 were conducted. The kind of each diene rubber used, the kind of each silica used, the compounding recipes used and the test results obtained are shown in Table 6.

TABLE 6

|  | Examples | | | | Comparative Example | |
|---|---|---|---|---|---|---|
|  | 10 | 11 | 12 | 13 | 6 | 7 |
| Diene rubber No. | 9 | 9 | 9 | 14 | 15 | 16 |
| Silica (1) | VN | VN | AQ | AQ | AQ | AQ |
| Compounding No. | 1 | 2 | 2 | 2 | 2 | 2 |
| Tensile strength (Kg/cm$^2$) | 203 | 196 | 180 | 163 | 125 | 145 |
| Elongation (%) | 480 | 410 | 350 | 420 | 270 | 310 |
| Hardness test (JIS) 23° C. | 70 | 72 | 72 | 73 | 75 | 75 |
| Resilience (%) 60° C. | 67 | 66 | 65 | 62 | 59 | 57 |
| Pico abrasion index | 150 | 141 | 139 | 112 | 85 | 100 |
| Compound ML$_{1+4}$, 100° C. | 94 | 98 | 101 | 90 | 155 | 115 |
| Roll processability | ◎ | ◎ | ○ | ○ | X | Δ |

Footnotes
(1) Silica
VN: Ultrasil VN3G (a product of Degussa, Inc.)
AQ: Nipsil AQ (a product of Nippon Silica Industrial Co., Ltd.)

As is clear from the results of Table 6, the effects of the method of kneading used, the kind of silica used, the polar group (hydroxyl group and tertiary amino group) of diene rubber, etc. are the same as when hydroxyl group-containing diene rubbers produced by emulsion polymerization are used (see Table 5). It is also clear that the primary hydroxyl group-containing diene rubber obtained by modification with ethylene oxide (EO) (Example 12) shows higher improvements under the same conditions, than the tertiary hydroxyl group-containing diene rubber obtained by modification with benzophenone (BPH) (Example 13).

EXAMPLES 14–20 AND COMPARATIVE EXAMPLES 7–8

Using, as a raw material rubber, a blend of one of the diene rubbers produced in Production Examples 2–4, with natural rubber and/or a polybutadiene (BR 1220, a product of Nippon Zeon Co., Ltd.), the same test as in Example 1 was conducted. Each composition of raw material rubbers used and the test results are shown in Table 7.

TABLE 7

|  | Examples | | | | | | | Comparative Example | |
|---|---|---|---|---|---|---|---|---|---|
|  | 14 | 15 | 16 | 17 | 18 | 19 | 20 | 7 | 8 |
| Raw material rubbers | | | | | | | | | |
| Diene rubber No. 9 | 70 | 30 | — | — | — | — | 50 | — | — |
| Diene rubber No. 10 | — | — | 70 | — | — | — | — | — | — |
| Diene rubber No. 11 | — | — | — | 70 | — | — | — | — | — |
| Diene rubber No. 12 | — | — | — | — | 70 | — | — | — | — |
| Diene rubber No. 13 | — | — | — | — | — | 70 | — | — | — |
| Diene rubber No. 16 | — | — | — | — | — | — | — | 70 | — |
| BR 1220 | — | — | — | — | — | — | 30 | — | 70 |
| Natural rubber | 30 | 70 | 30 | 30 | 30 | 30 | 20 | 30 | 30 |
| Tensile strength (Kg/cm$^2$) | 230 | 220 | 225 | 255 | 210 | 180 | 235 | 155 | 160 |
| Elongation (%) | 400 | 430 | 480 | 400 | 430 | 380 | 510 | 350 | 320 |
| Hardness test (JIS) 23° C. | 66 | 65 | 66 | 67 | 66 | 63 | 66 | 72 | 63 |
| Resilience (%) 60° C. | 67 | 65 | 68 | 69 | 65 | 67 | 72 | 61 | 60 |
| Pico abrasion index | 115 | 108 | 125 | 145 | 110 | 165 | 125 | 105 | 122 |
| Compound ML$_{1+4}$, 100° C. | 75 | 83 | 82 | 88 | 88 | 85 | 70 | 100 | 103 |
| Roll processability | ◎ | ◎ | ○ | ○ | ◎ | ○ | ◎ | ○ | X |

As is clear from the results of Table 7, the cases using, in combination, a hydroxyl group-containing styrene-butadiene copolymer rubber and natural rubber (Examples 14–18), as compared with the case using, in combination, a hydroxyl group-free styrene-butadiene copolymer rubber and natural rubber (Comparative Example 7), are sufficiently improved in properties such as compound Mooney viscosity, hardness, tensile strength, resilience, abrasion resistance, etc.; and the cases using a hydroxyl group-containing styrene-butadiene copolymer rubber having a high 1,2-vinyl group content in conjugated diene unit (Examples 14, 15, 18 and 20) show particularly high improvement in processability. While the case using a conventional polybutadiene (BR 1220) together with natural rubber and silica (Comparative Example 8) is inferior in processability and shows no satisfactory properties, the case replacing the BR 1220 with a hydroxyl group-containing polybutadiene rubber obtained by modification with ethylene oxide (Example 19) is improved in processability and also in tensile strength, resilience and abrasion resistance. Further, the case using three rubbers, i.e. a hydroxy group-containing diene rubber, natural rubber and a polybutadiene rubber (Example 20) shows sufficient improvements as well.

What is claimed is:

1. A rubber composition comprising a diene rubber component and acidic silica as reinforcing agent, wherein the diene rubber component is a hydroxyl group-containing diene rubber (A) having a weight-average molecular weight of 50,000 or more, or a blend of the hydroxyl group-containing diene rubber (A) and other diene rubber (B), wherein hydroxyl group-containing diene rubber (A) is a solution or anionic polymer with bound active metal in the molecule reacted with an hydroxyl group introducing modifier.

2. A rubber composition according to claim 1, wherein the hydroxyl group-containing diene rubber (A) is a rubber obtained by reacting a polymer of a conjugated diene monomer or a copolymer of a conjugated diene monomer and other copolymerizable monomer, the (co)polymer having a bound active metal in the molecule, with at least one compound selected from a ketone, an ester, an aldehyde and an epoxy to introduce a hydroxyl group(s) in the (co)polymer.

3. A rubber composition according to claim 2, wherein the contents of the conjugated diene monomer and the monomer copolymerizable therewith in the (co)polymer are 40–100% by weight and 0–60% by weight, respectively.

4. A rubber composition according claim 1, wherein the copolymerizable monomer is an aromatic vinyl monomer.

5. A rubber composition according to claim 4, wherein the chains of the aromatic vinyl monomer in the hydroxyl group-containing diene rubber (A) are distributed in such a mode that the content of the independent chains each consisting of one aromatic vinyl unit is 40% by weight or more of the amount of bound aromatic vinyl monomer and the content of the long chains each consisting of eight or more continuous aromatic vinyl units is 5% by weight or less of the amount of bound aromatic vinyl monomer.

6. A rubber composition according claim 1, wherein the vinyl content in the bound conjugated diene unit is 10% to less than 30%.

7. A rubber composition according claim 1, wherein the vinyl content in the bound conjugated diene unit is 30–90%.

8. A rubber composition according claim 1, wherein the hydroxyl group is primary or secondary.

9. A rubber composition according claim 1, further comprising a silane coupling agent.

10. A rubber composition according to claim 9, wherein the amount of the silane coupling agent contained is 0.01–30 parts by weight per 100 parts by weight of the rubber component.

11. A rubber composition according to claim 1 wherein the amount of acidic silica is from 20 to 150 parts by weight per 100 parts by weight of the diene rubber component.

12. A rubber composition according to claim 11 wherein the acidic silica has a specific surface area as measured by nitrogen adsorption (a BET adsorption method) of 50–400 m$^2$/g.

13. A rubber composition according to claim 12 wherein the acidic silica has a specific surface area as measured by nitrogen adsorption (a BET adsorption method) of 100–250 m$^2$/g.

14. A rubber composition according to claim 13 wherein the acidic silica has a specific surface area as measured by nitrogen adsorption (a BET adsorption method) of 120–190 m$^2$/g.

15. A process for producing a rubber composition by mixing a diene rubber component, acidic silica as reinforcing agent, and other compounding agents, wherein the diene rubber component is a hydroxyl group-containing diene rubber (A) which is a solution or anionic polymer with bound active metal in the molecule reacted with an hydroxyl group introducing modifier and having a weight-average molecular weight of 50,000 or more, or a combination of the hydroxyl group-containing diene rubber (A) and other diene rubber (B) and their mixing is conducted by mixing the diene rubber component with at least part of a required amount of acidic silica and then mixing the resulting mixture with the remainder of acidic silica and other compounding agents.

16. A process according to claim 15, wherein the hydroxyl group is present at the terminal of the diene polymer.

17. A rubber composition according to any one of claims 1 or 6–15, wherein the hydroxyl group is present at the terminal of the diene polymer.

18. A rubber composition according to claim 6, wherein the copolymerizable monomer is an aromatic vinyl monomer.

19. A rubber composition according to claim 18 wherein the vinyl content in the bound conjugated diene unit is 10% to less than 30%.

20. A rubber composition according to claim 18 wherein the vinyl content in the bound conjugated diene unit is 30–90%.

21. A rubber composition according to claim 20 wherein the hydroxyl group is primary or secondary.

22. A rubber composition according to claim 21 further comprising a silane coupling agent.

23. A rubber composition according to claim 22 wherein the amount of the silane coupling agent is from 0.01 to 30 parts by weight per 100 parts by weight of the rubber component.

24. A rubber composition according to claim 23 wherein the amount of acidic silica is from 20 to 150 parts by weight per 100 parts by weight of the diene rubber component.

25. A rubber composition according to claim 24 wherein the acidic silica has a specific surface area as measured by nitrogen adsorption (a BET adsorption method) of 50 to 400 m$^2$/g.

26. A tire comprising a vulcanized rubber obtained by vulcanizing the rubber composition of any one of claims 1, 2–11, 14, 18 or 25.

27. The process of claim 15 which comprises first mixing the diene rubber with from 10 to 90% by weight of the total amount of acidic silica and thereafter mixing the resulting mixture with the remainder of the acidic silica and other compounding agents.

28. The process of claim 15 which comprises first mixing the diene rubber with from 10 to 90% by weight of the total amount of acidic silica and, optionally, either or both of silane coupling agent and activating agent, and thereafter mixing the resulting mixture with the remainder of the acidic silica and other compounding agents.

* * * * *